(No Model.) 3 Sheets—Sheet 1.
L. BROWN.
MOTOR VEHICLE.
No. 577,716. Patented Feb. 23, 1897.
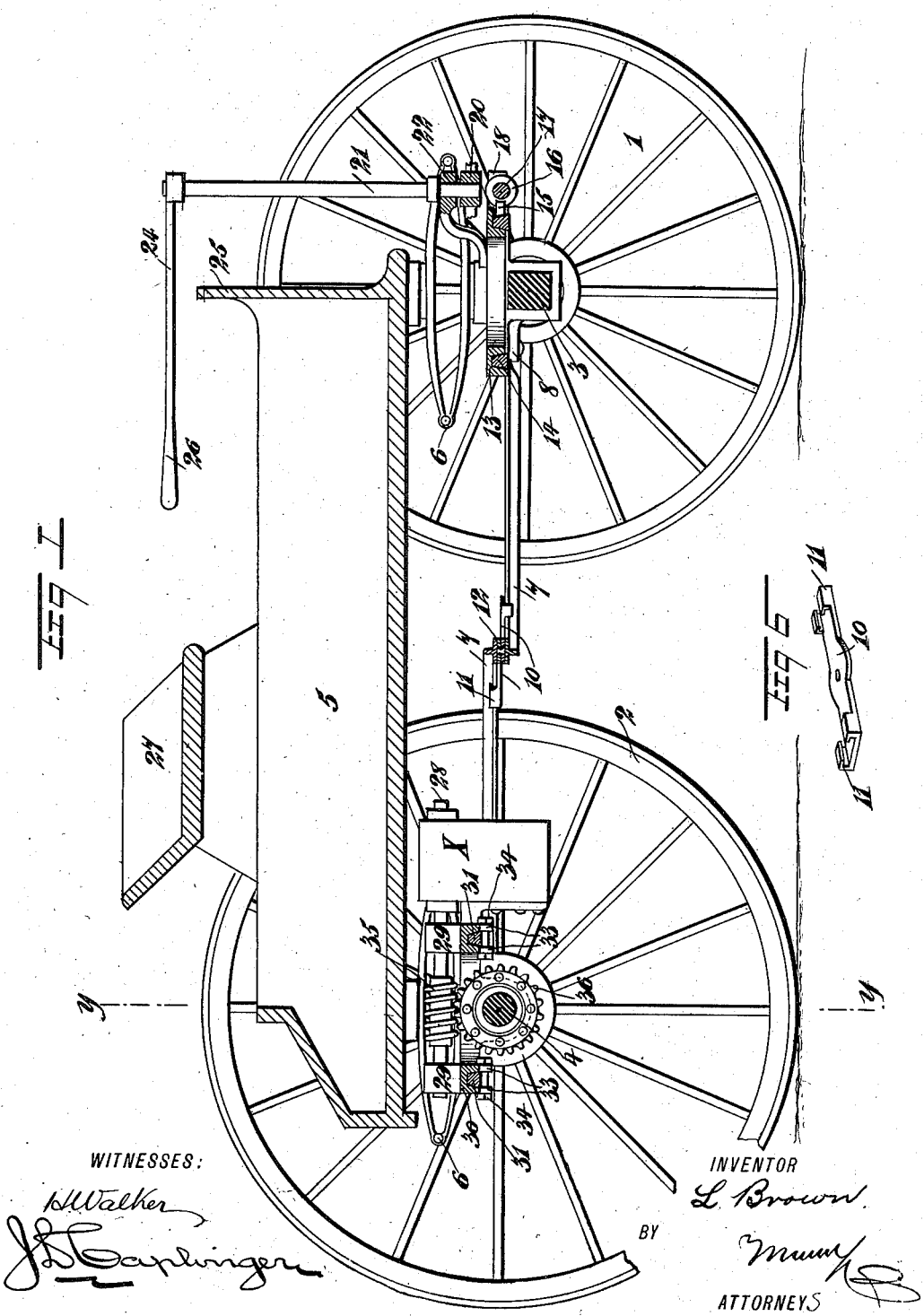
WITNESSES:
INVENTOR
L. Brown.
BY
ATTORNEYS (No Model.) 3 Sheets—Sheet 2.
L. BROWN.
MOTOR VEHICLE.
No. 577,716. Patented Feb. 23, 1897.
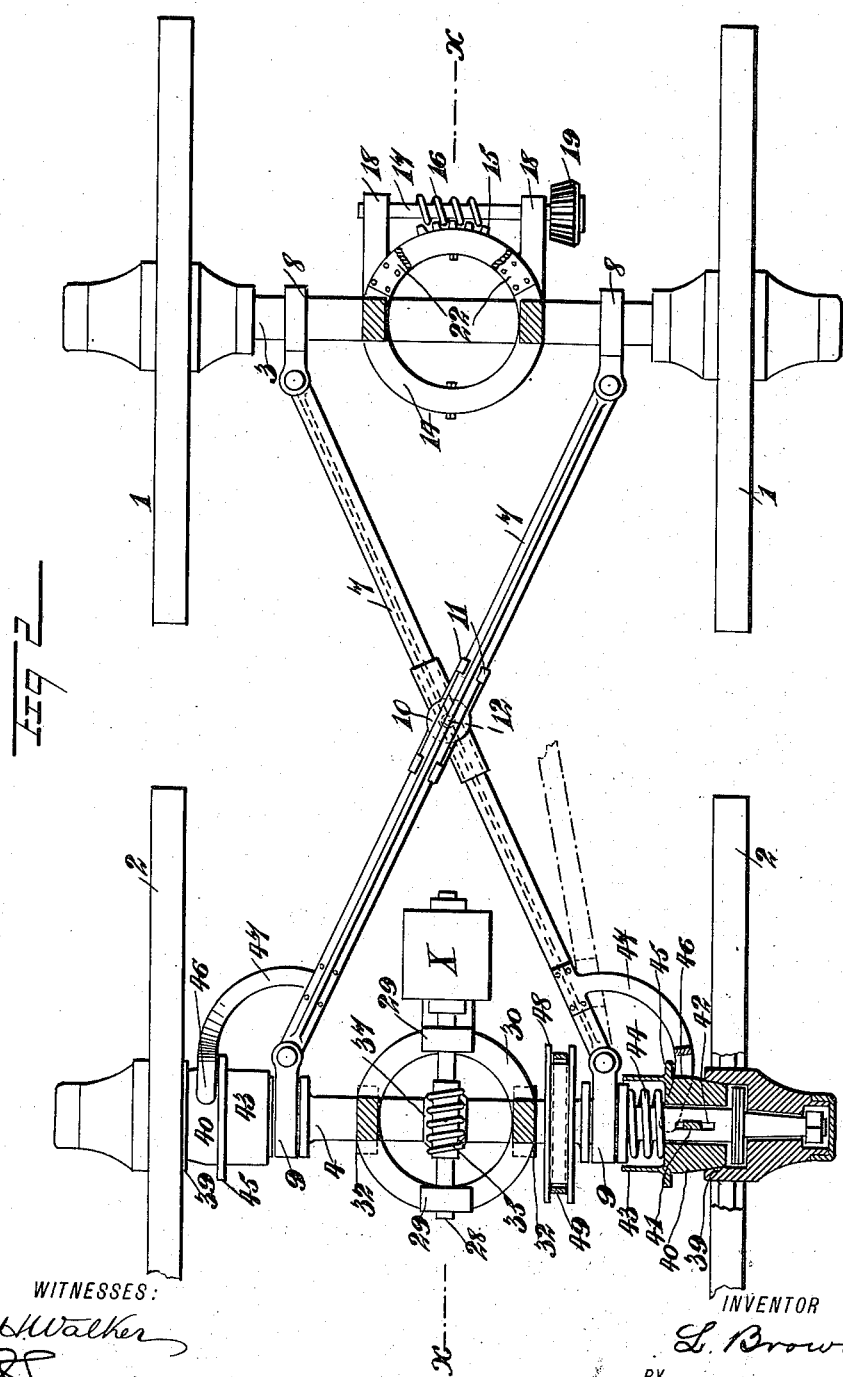
WITNESSES:
L.H.Walker
J.D.Caplinger
INVENTOR
L. Brown.
BY
Munn
ATTORNEYS (No Model.)  L. BROWN.  3 Sheets—Sheet 3.
MOTOR VEHICLE.
No. 577,716. Patented Feb. 23, 1897.
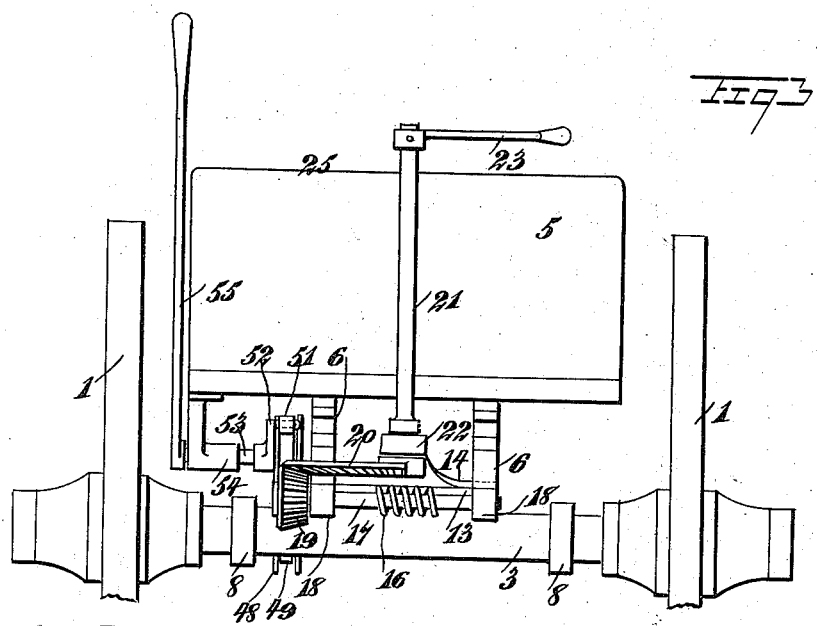
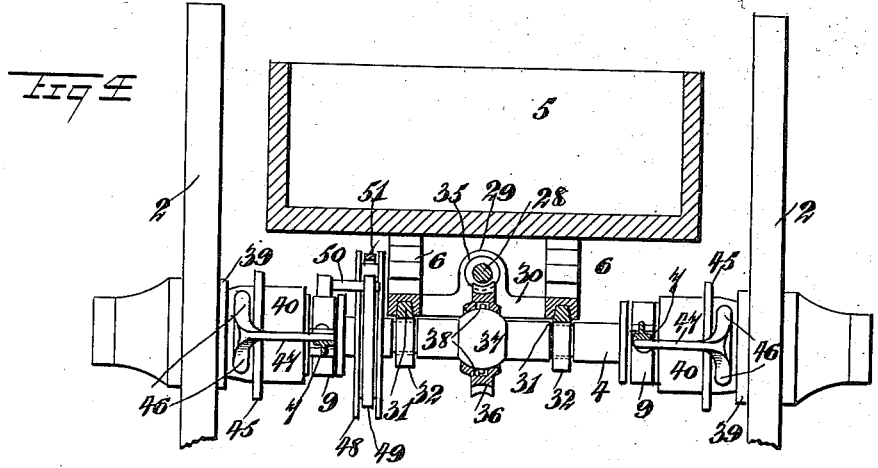
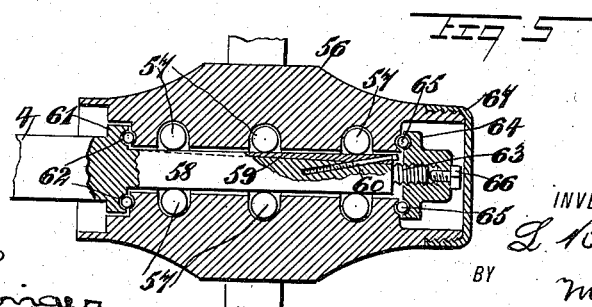
WITNESSES:
H. Walker
J. B. Caplinger
INVENTOR
L. Brown
BY
ATTORNEYS

UNITED STATES PATENT OFFICE.

LEWIS BROWN, OF SAWKILL, NEW YORK.

MOTOR-VEHICLE.

SPECIFICATION forming part of Letters Patent No. 577,716, dated February 23, 1897.

Application filed January 16, 1896. Serial No. 575,673. (No model.)

*To all whom it may concern:*

Be it known that I, LEWIS BROWN, of Sawkill, in the county of Ulster and State of New York, have invented a new and Improved Automatic Vehicle, of which the following is a full, clear, and exact description.

This invention relates to certain improvements in automatic vehicles such as are provided with means for driving them, and has for its object to provide a vehicle of this character, of a simple and inexpensive construction, which shall be light and strong and shall be adapted for use either as an ordinary road-wagon or as a light passenger-vehicle.

The invention consists in a vehicle of this character comprising a body, wheels mounted on axles supporting the body, one axle being rotative and having its wheels provided with clutches, whereby they are normally held to turn with the axle, means for disengaging the wheels from the axle to permit freedom of movement of the wheels in turning, and a motor carried by the body and arranged to drive said axle.

The invention also contemplates certain novel features of the construction, combination, and arrangement of the various parts of the improved vehicle, whereby certain important advantages are attained and the device is made simpler, cheaper, and otherwise better adapted and more convenient for use than various other similar devices heretofore employed, all as will be hereinafter fully set forth. The novel features of the invention will be carefully defined in the claims.

Reference is to be had to the accompanying drawings, forming a part of this specification, in which similar characters of reference indicate corresponding parts in all the views.

Figure 1 is a section taken longitudinally through a vehicle constructed in accordance with my invention, the plane of the section being indicated by the line $x\,x$ in Fig. 2. Fig. 2 is a sectional plan view of the running-gear of the vehicle, the body thereof being removed. Fig. 3 is a front view of the running-gear and body of the vehicle. Fig. 4 is a vertical transverse section taken in the plane indicated by the line $y\,y$ in Fig. 1. Fig. 5 is a longitudinal section drawn to an enlarged scale and taken through the hub of one of the front wheels of the vehicle, and Fig. 6 is a perspective detail view of one of the brackets employed for connecting the reaches together.

In the views, 1 and 2 represent, respectively, the front and rear wheels of the improved vehicle, mounted on forward and rear axles 3 and 4, the forward axle being rectangular in cross-section, while the rear axle is circular, as shown in Fig. 1.

5 indicates the body of the vehicle, herein shown as that of a light road-wagon, supported on springs 6 from the axles 3 and 4.

The front and rear axles 3 and 4 are connected together by crossed reaches 7, formed of metal bars having longitudinal ribs projecting from their upper and lower faces, as clearly shown in Figs. 1 and 2, said reaches being connected to the forward axle 3 by means of clips 8, secured to opposite ends of the axle, to which clips the reaches are pivoted, and being connected at their rear ends to clips 9, held by collars on the rear axle, as clearly shown in Fig. 2. The reaches 7 are crossed over one another, as clearly shown in Fig. 2, and at its central portion each reach is provided with a bracket 10 of flattened form, as seen in Fig. 6, having at its ends oppositely-arranged inturned lugs 11, adapted to be bent over the edges of the reach to hold said bracket thereto. At their central portions the brackets 10 on the respective reaches are provided with perforations to receive a bolt 12, as clearly shown in Fig. 1, whereby said brackets are pivotally connected together.

The springs 6 at the front end of the wagon-body are supported at opposite sides of a fifth-wheel composed of upper and lower sections 13 and 14, each made in an angular form, the lower section 14 being beveled on its opposite sides to fit a beveled recess in the under side of the upper section 13. The lower section 14 of the fifth-wheel will be secured to the forward axle in any preferred way, and at its forward part the front wall of the upper section 13 is broken out, as shown in Fig. 1, to permit the passage through said wall of a series of teeth 15, projecting from the front face of the lower section 14 and meshing with a worm 16 on a shaft 17, extending transversely beneath the bed 5, being journaled at its ends in forwardly-projecting lugs 18, formed on the opposite sides of the upper section 13 of the fifth-wheel, as clearly shown in Figs. 2 and 3.

At one end the shaft 17 has fixed on it a bevel-pinion 19, meshing with a bevel gear-wheel 20, secured on the lower end of a shaft 21, journaled in a bearing 22, projecting upwardly from the upper section 13 of the fifth-wheel, and said shaft 21 extends vertically upward in front of the dashboard 25 of the vehicle, as clearly shown in Figs. 1 and 3, and is provided at its upper end with a crank-arm 24, pivoted thereon and extending rearwardly, being provided with a handle 26 inside the dashboard and arranged to be conveniently operated by a person sitting on the seat 27. In this way it will be seen that when it is desired to turn the vehicle the driver simply manipulates the lever 26, so as to turn the gear-wheel 20 in one or the other direction, the movement of said gear-wheel being transmitted through the pinion 19, the worm 16, and the teeth 15 on the lower section 14 of the fifth-wheel to turn the forward axle pivotally, whereby the vehicle will also be turned.

Under the rear part of the bed 5 of the vehicle is arranged a motor X of any preferred form, having a driving-shaft 28 extending at right angles to the rear axle 4 of the vehicle and journaled in lugs 29, formed at the front and rear parts of a fifth-wheel mounted on the rear axle and of a construction similar to that of the fifth-wheel which is mounted on the forward axle, said fifth-wheel on the rear axle comprising an upper section 30 and a lower section 31, fitting in a groove or recess formed in the under side of the upper section.

The upper section 30 of the fifth-wheel is by preference, as shown in Fig. 1, provided at opposite sides of its recessed under part with depending perforated lugs 33, having bolts 34 extending through them and across the under side of the lower section 31 in position to hold the two sections together, whereby the upper section will not be thrown out of engagement with the lower section by the jolting of the vehicle. The same construction may be provided on the forward fifth-wheel to hold the two sections thereof together.

On the driving-shaft 28 of the motor X, between the lugs 29 on the rear fifth-wheel, is held a screw or worm 35, meshing with a worm-wheel 36, held on the rounded or spheroidal enlargement 37, formed centrally on the rear axle 4, said enlargement 37 being provided with oppositely-arranged lugs 38, engaging recesses in the bore of said worm-wheel, whereby it will be seen that the axle 4 is permitted to swing pivotally in a horizontal plane without throwing the worm-wheel out of engagement with the worm on the shaft 28.

The rear wheels 2 of the vehicle are mounted loosely on the rear axle 4, having hubs 39, which, as shown in Fig. 2, are recessed on their inner sides to receive conical or tapering sleeves 40, mounted to slide endwise on the opposite end portions of the axle 4, said sleeves 40 being provided with pins 41, extending through them and through slots or keyways 42, formed in the opposite ends of the axle 4, whereby it will be seen that the said sleeves 40 are caused to turn with the axle 4 when the same is driven.

The sleeves 40 are recessed on their inner sides, as seen at 43, and in said recesses are arranged spiral springs 44, coiled on the axle 4 and engaging collars fixed thereon in such a way as to normally hold the sleeves in an outward position, as shown in Fig. 2, whereby the tapered outer ends of the sleeves are held in engagement with the recesses in the inner sides of the hubs 39, so as to cause the wheels 2 to be driven from the axle 4. The reaches 7 are provided at their opposite ends with arms 47, curved outwardly and rearwardly, as clearly shown in Figs. 2 and 4, and forked, as shown at 46, at their extremities, the forks of said arms being engaged with the outer sides of collars 45, formed on the sleeves 40. By this construction it will be seen that when the forward axle is turned, as above described, under the vehicle the rear axle 4 will be similarly turned, owing to the pivotal connection between the crossed reaches 7, and as said rear axle swings pivotally the forked ends 46 of an arm 47 on the inside reach will be caused to engage the flange 45 on the inner sleeve 40 of the rear axle in such a way as to slide said sleeve inward and out of engagement with the recess in the inner face of the inner wheel 2, whereby said wheel will be permitted to turn on the axle and will no longer be driven therefrom. In this way it will be seen that the strain on the axles and wheels and also on the driving connections caused by the outer wheel traveling farther than the inner wheel will be entirely prevented.

On the rear axle 4 is mounted a friction-disk 48, having a grooved periphery engaged by a brake-strap 49, one end of which is connected to a fixed lug 50, while the opposite end 51 of said strap is carried forward, as indicated in Fig. 3, and connected to a crank-arm 52 and a shaft 53, journaled in a lug or bearing 54, depending from the body 5, and provided with an arm 55, extending up so as to be in convenient reach of the rider. In this way the lever 51 may be conveniently operated by the driver to draw the brake-strap tightly around the friction-disk when it is desired to stop the vehicle.

In Fig. 5 I have shown the construction of hub preferably provided on the forward wheels of the vehicle. In this construction the hub 56 is provided with three grooves in its interior to receive three independent series of balls 57, running on the axle-skein 58, and said skein is provided with a wedgeshaped slide 59, actuated by means of a screw 60, as clearly shown. In this way when the axle-skein becomes worn so that the wheel turns too easily the screw 60 may be operated to move the wedge 59 endwise, so as to take up the wear. At the inner end of the hub the axle 4 is provided with an enlargement 61, between which and the end of the hub is arranged a series of balls 62.

The outer end of the axle-skein 58 is provided with a reduced screw-threaded portion 63, whereon screws a nut 64, between which and the outer face of the hub is arranged another series of balls 65. A set-screw 66 is employed, mounted in the nut 64 and arranged to engage the end of the reduced portion 63 of the axle, and the outer end of the hub 56 is chambered to receive said nut 64 and is provided with a dust-cap 67, arranged to screw upon it.

From the above description of my invention it will be seen that the vehicle is of an extremely simple and inexpensive construction and is well adapted for the purposes for which it is intended, since the motor X is so arranged as to be completely out of sight and out of the way of the person in the vehicle, and the gearing between said motor and the driving-axle is further of an extremely simple and light construction, being, however, sufficiently strong for all practical purposes. It will also be seen that by the special construction of the steering-gear the vehicle may be readily turned without imposing excessive strain on the parts, and by means of the brake device described the vehicle may be readily stopped. It will also be obvious from the above description of my invention that the device is susceptible of considerable modification without material departure from its principles and spirit, and for this reason I do not wish to be understood as limiting myself to the precise construction and arrangement of the parts herein set forth.

Having thus described my invention, I claim as new and desire to secure by Letters Patent—

1. In a vehicle, the combination of a bed, forward and rear axles mounted to swing in horizontal planes under the bed, crossed reaches connected at opposite ends to the opposite ends of the respective axles, and brackets secured to the central portions of the respective reaches, said brackets being pivoted together, substantially as set forth.

2. In a vehicle, the combination of a bed, forward and rear axles arranged to swing in horizontal planes under the bed, reaches connecting the axles, means for swinging one of the axles, means for rotating the other axle, wheels on the axles, the wheels which are on the axle having means for rotating it, being provided with clutches normally arranged to hold the wheels to rotate with the axle, and arms carried by the reaches and arranged when the axle is swung pivotally, to place one of said clutches out of operation, substantially as set forth.

3. The combination of two axles, two reaches respectively pivoted to the axles and extended across each other, and two plates connected to each other and respectively having sliding connection with the reaches, substantially as described.

4. In a vehicle, the combination of two axles, wheels for the axles, two reaches each respectively pivoted to the axles, the reaches being crossed at a point between the axles, two plates connected with each other and respectively slidably connected on the reaches, an arm fixed to each reach adjacent to one end thereof, and a clutch connected with each arm, the clutches being capable of engaging or disengaging the respective adjacent wheels with the axles, substantially as described.

LEWIS BROWN.

Witnesses:
J. D. COPLINGER,
JNO. M. RITTER.